3,448,733
AUXILIARY FUEL SUPERHEATER FOR STARTING
INTERNAL COMBUSTION ENGINES
Leonard E. Aske, 5508 Park Ave.,
Minneapolis, Minn. 55417
Filed May 10, 1967, Ser. No. 637,580
Int. Cl. F02m 1/00; F23q 7/00
U.S. Cl. 123—180                                    11 Claims

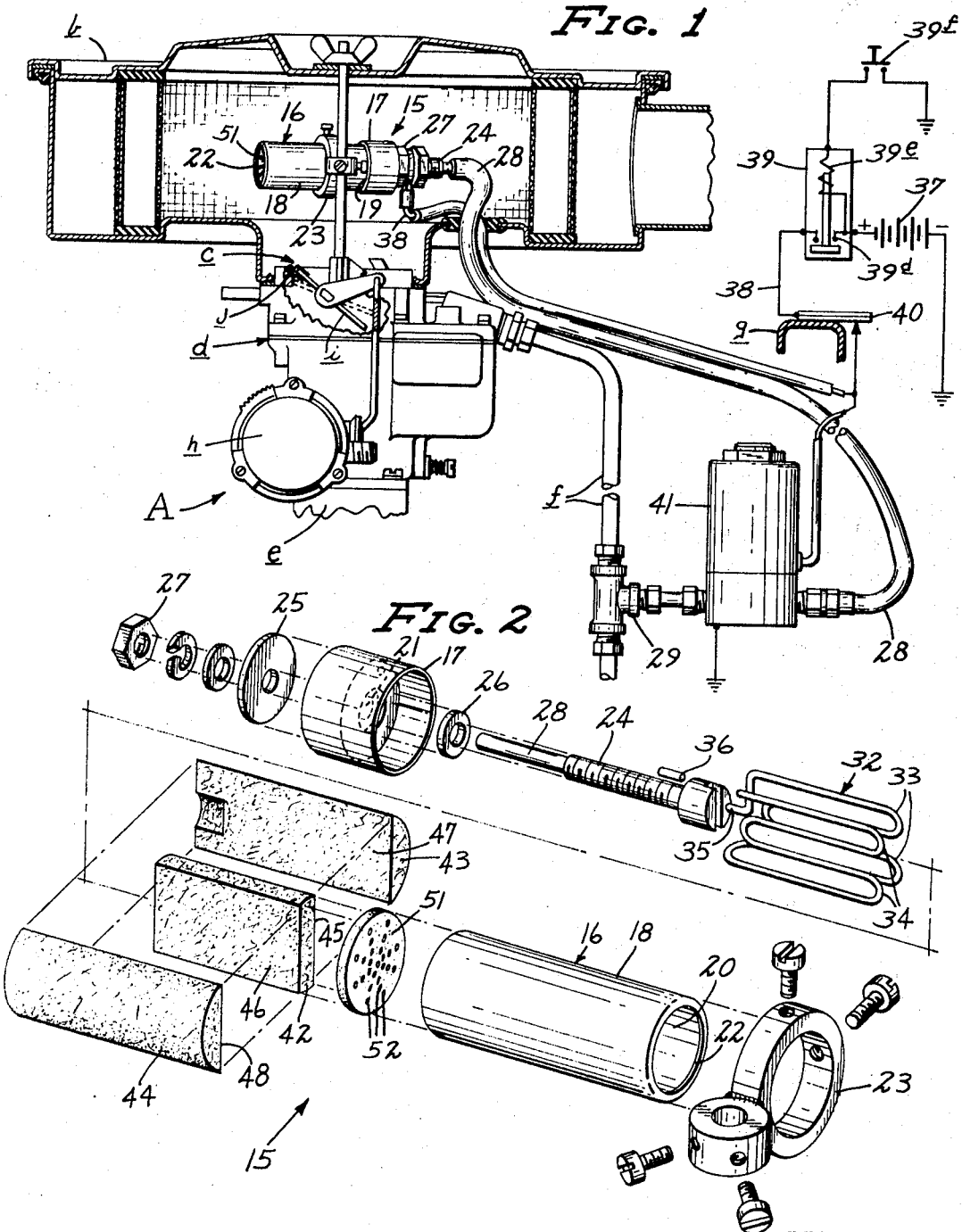

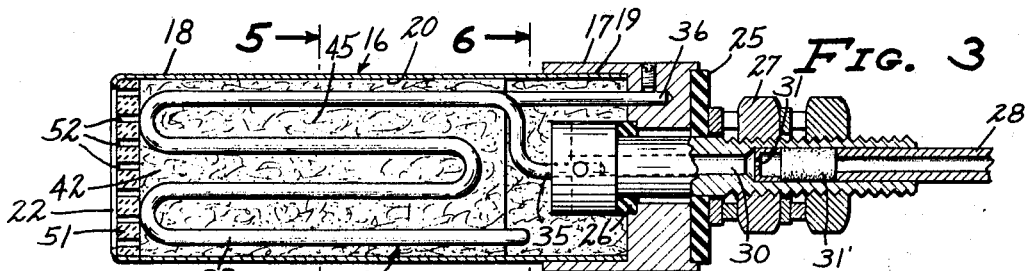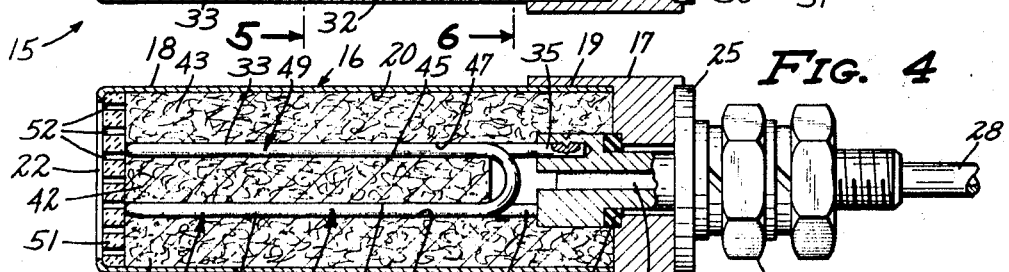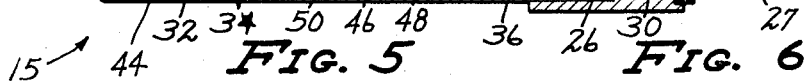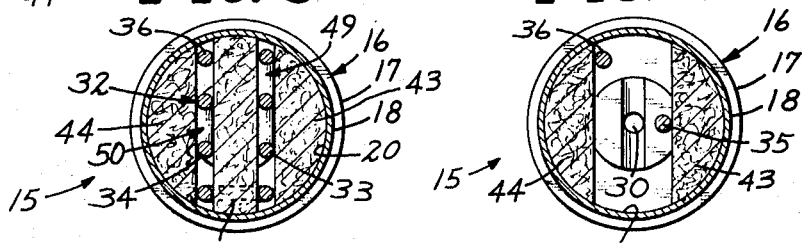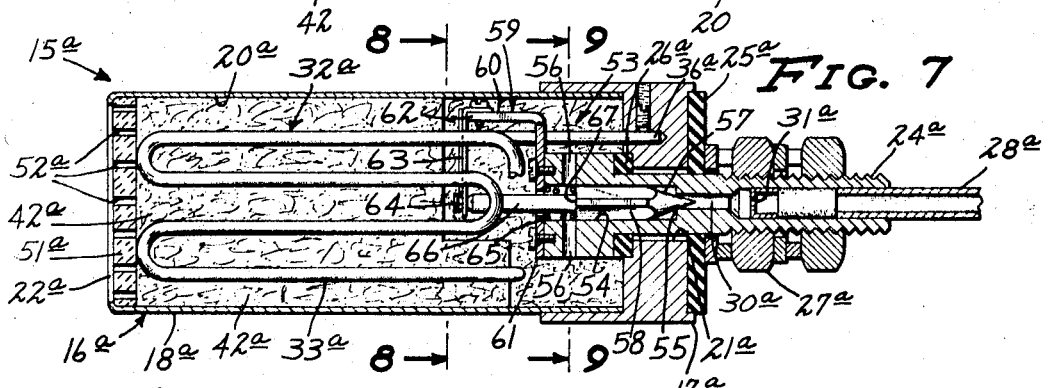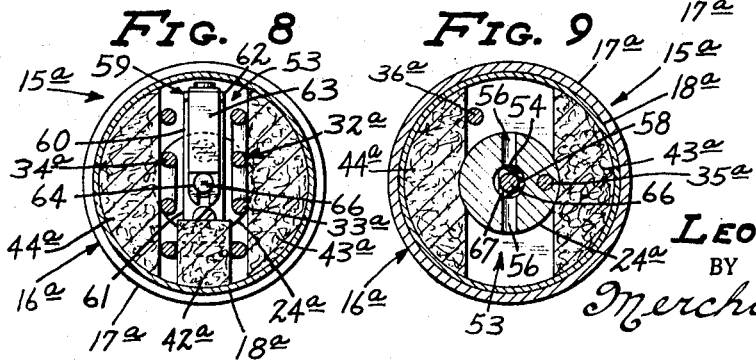
INVENTOR.
LEONARD E. ASKE
BY
Merchant & Gould
ATTORNEYS June 10, 1969
L. E. ASKE
3,448,733
AUXILIARY FUEL SUPERHEATER FOR STARTING INTERNAL
COMBUSTION ENGINES
Filed May 10, 1967
Sheet 3 of 3
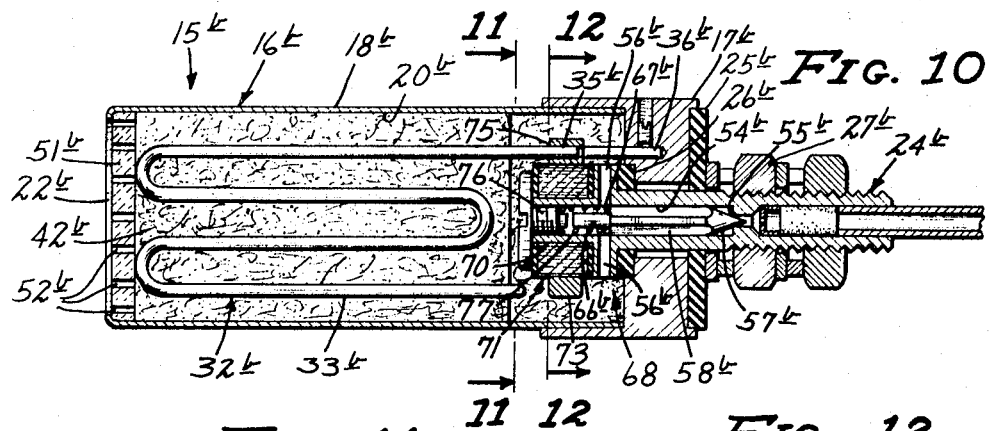
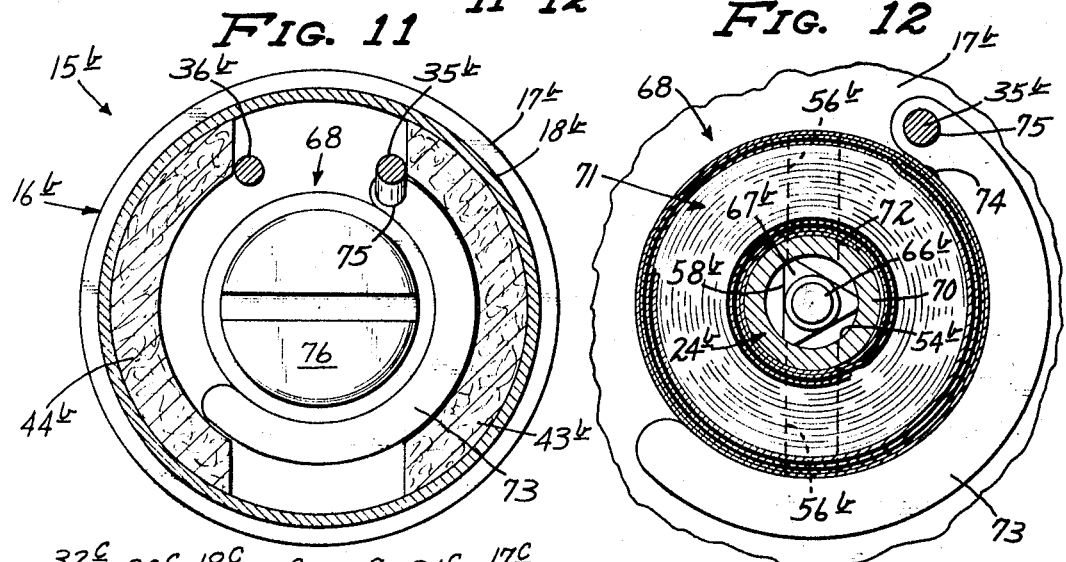
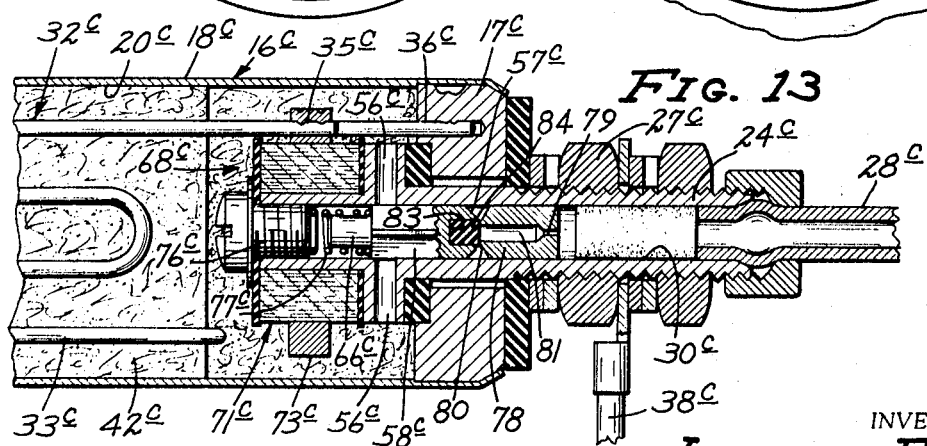
INVENTOR.
LEONARD E. ASKE
BY
Merchant & Gould
ATTORNEYS United States Patent Office 3,448,733
Patented June 10, 1969

ABSTRACT OF THE DISCLOSURE

A device for facilitating the starting of internal combustion engines under cold weather conditions by converting raw gasoline into a hot, dry, superheated vapor that mixes instantly with the air in the air cleaner forming a highly combustible mixture to be carried into the carburetor, intake manifold and combustion chamber. The raw gasoline is introduced into a superheater chamber for absorption by a plurality of porous blocks that are positioned to define restricted fuel flow passages along an electrical heating element. The gasoline is first vaporized by the heating element and then the vapor is superheated as it passes through the restricted fuel flow passages. The superheated vapor is discharged from the chamber into the air cleaner through a disc element having a plurality of restricted openings formed therein.

BACKGROUND OF THE INVENTION

Field of the invention

This invention relates generally to apparatus for facilitating the starting of internal combustion engines under cold weather conditions, and more particularly, relates to a device for converting raw gasoline into a superheated vapor that is subsequently mixed with air before being introduced into the carburetor.

Description of the prior art

For many years, the owners of automobiles and other vehicles employing internal combustion engines have experienced difficulty in starting the engines under cold weather conditions, especially in those areas where the temperature falls to many degrees below freezing. It has been demonstrated that the chief causes of poor starting in cold weather are poor fuel vaporization and slow cranking speed. The slow cranking speed in cold weather is caused by a lower power output of the lead storage battery and by the high viscosity of the oil in the engine crankcase. In gasoline type engines, the lower power output of the battery also results in a much weaker spark being available in cold weather.

Although all of the causes of poor starting in cold weather are related and interdependent, the elimination of any one cause will often result in elimination of the problem of poor starting. The present invention is designed to eliminate the chief cause of poor starting, which is poor fuel vaporization, by providing an auxiliary source of superheated gasoline vapor to be used in starting the engine. If a sufficient amount of dry gasoline vapor is available to the engine immediately upon the initiation of starting operations, the engine will start even though the cranking speed is slow and the spark is weak.

In gasoline engines, poor fuel vaporization results from the low volatility of gasoline at low temperatures. Since gasoline is not a pure substance, but a mixture of hydrocarbons of varying molecular weights and thermodynamic properties, vaporization takes place over a wide temperature range with complete vaporization occurring at approximately 400° F. With the temperature of the engine and the gasoline at 0° F., for example, only about 10% of the gasoline flow into the carburetor is converted into a vapor. Even this small amount of vapor will often not reach the cylinders since much of it will rapidly condense when it comes in contact with the cold engine. Under these conditions, over 90% of the gasoline passing through the carburetor remains a liquid that will not mix with the incoming air to form a combustible gas. If combustion of the small amount of vapor that does exist does not occur within a few turns of the engine, the engine will flood and become impossible to start until the flooding is cleared.

The prior art discloses that attempts have been made to increase the amount of fuel vaporization in order to facilitate cold weather starting. For example, the Balzer et al. Patent 2,719,520 that issued Oct. 4, 1955 discloses a fuel vaporizer mounted in the intake manifold of a gasoline engine. The Balzer vaporizer comprises an electric heating element supported by a pair of electrodes at a point not more than 1/4" from the floor of the intake manifold. The device heats the area underneath the carburetor in an attempt to vaporize the liquid fuel passing through the carburetor under cold weather starting conditions. One basic problem with the Balzer device is the fact that it is located downstream from the carburetor and so situated that most of the heat produced by the device is dissipated. For example, during the first few turns of the engine, when it must start if it is to start at all, most of the heat produced by the heating element is absorbed by the cold intake manifold. Also, since the device is positioned downstream from the air intake, much heat is wasted in heating the incoming air. The heated air increases tremendously in volume, thus reducing the concentration of gasoline vapor being introduced into the cylinder itself. In essence, the Balzer device is not so designed or situated that it can effectively increase the amount of fuel being vaporized at a time when such vaporized fuel is most needed.

Other fuel vaporizers of the type disclosed in the Balzer et al. patent are also disclosed in the Graziano Patent 2,314,140 that issued Mar. 16, 1943, and in the Belanger Patent 1,931,837 that issued Oct. 24, 1933. Again, these devices are so designed and situated that much of the heat developed by the heating element is dissipated and is not effective to completely vaporize the fuel being introduced into the engine.

SUMMARY OF THE INVENTION

The present invention is a great advance over those devices disclosed in the prior art since it completely converts raw gasoline into a hot, dry, superheated vapor that mixes instantly with the air before being introduced into the engine. The weakest type of spark will be sufficient to fire this highly combustible mixture.

As previously mentioned, only about 10% of the normal gasoline flow into the carburetor is converted into at vapor at 0° F. Much of this vapor is obtained through turbulence when the gasoline is atomized in the carburetor and will readily condense when it comes in contact with the cold engine. Therefore, only a very small portion of the gasoline introduced into the carburetor eventually reaches the combustion chamber in the vapor state. Even if a greater percentage of the gasoline is vaporized through the use of prior art devices, as above described, the resultant vapor will rapidly cool as it passes through the intake manifold to the combustion chamber and will quickly return to the liquid phase because of the low ambient temperature. If a certain fraction of the liquid gasoline is vaporized because of an increase in temperature to the vaporization point for that fraction, or because of turbulence in the carburetor, that fraction will remain as a vapor only as long as the vaporization temperature for that fraction is maintained. As soon as the heated vapor leaves the area heated by the prior art devices, the temperature is reduced below the vaporization point for that fraction and that fraction will return to the liquid phase. Therefore, the problem is not only to vaporize the liquid gasoline but also to maintain the gasoline in the vapor phase until it reaches the combustion area.

In line with these objectives, the present invention is designed not only to vaporize the gasoline completely but also to superheat the gasoline vapor so that it will be carried in the vapor phase to the combustion chamber. In the preferred embodiment of my auxiliary fuel superheater, a housing member is provided having a generally cylindrical chamber therein. Raw gasoline or other fuel is introduced into a first portion of the chamber through a restricted orifice designed to meter the correct amount of fuel into the chamber. Mounted in a second portion of the chamber is a resistance heating element that is connected in series with a circuit for passing electric current therethrough. A plurality of porous, non-flammable blocks are mounted in the second portion of the chamber adjacent the heating element and positioned to form restricted fuel flow passages along the heating element. A disc element is mounted in the housing opposite the chamber from the fuel intake portion. A plurality of small openings are formed in the disc element to permit a restricted flow of gasoline vapor outwardly therethrough from the chamber.

When fuel is introduced into the chamber, it is absorbed by the porous blocks. The resistance heating element is energized to vaporize the fuel adjacent the element. As the fuel is vaporized, the vapor passes through the restricted fuel flow passages along the heating element so that the fuel is not only vaporized but superheated far above its vaporization point. The dry superheated vapor then passes through the small openings in the disc element and is mixed with air in the air cleaner before being drawn into the carburetor, intake manifold and combustion chamber. By forcing the vaporized fuel to pass along the heating element through the restricted fuel flow passages, complete vaporization and superheating of all the fuel fractions is assured.

In the case of gasoline, complete vaporization occurs at temperatures above approximately 400° F. The apparatus of my invention heats the gasoline vapors well above 400° F., in some cases as high as 600° F., to assure that all fractions of the gasoline are not only vaporized but superheated. This superheated vapor is discharged from the apparatus of my invention as a milky white vapor that readily mixes with the incoming air. In order to condense this superheated vapor, the excess sensible heat must first be removed and then the latent heat of vaporization removed. Through many tests of this device, I have found that the superheated vapor will not condense for as long as 4 and 5 minutes, even if exposed to a cold ambient temperature. To further test the stability of this superheated vapor, I deliberately disconnect the ignition system of an automobile and introduced the vapor into the carburetor while turning over the engine with the starter motor. I found that the milky white superheated vapor was carried completely through the engine and was discharged from the exhaust in its original condition. No substantial condensation occurred during its passage through the engine.

The auxiliary fuel superheater of my invention is normally mounted on the air cleaner center post directly above the air intake opening to the carburetor. The preferred operational sequence of the system is as follows:

The operator depresses a manual switch on the dashboard of the vehicle which initiates current flow through the heating element and opens a valve to allow fuel flow into the superheater chamber. After a delay of 1–3 seconds to allow the heating element to heat up, and while continuing to depress the manual switch, the operator engages the engine starting motor causing the engine fuel pump to force fuel into the superheater chamber. The gasoline entering the superheater chamber comes in contact with the energized heating element and is immediately converted into a vapor which is superheated and discharged through the restricted openings in the disc element. The superheated vapor is mixed with air in the air cleaner and is drawn into the carburetor, intake manifold and combustion chamber where even the weakest spark is sufficient to fire the mixture. After the engine starts, the operator releases the manual switch to deenergize the heating element and stop the flow of fuel to the superheater chamber.

Other variations of my invention will be discussed in connection with the drawings, which I describe below.

BRIEF DESCRIPTION OF THE DRAWINGS

Referring to the drawings wherein like reference characters indicate like parts throughout the several views:

FIG. 1 is a view partially in elevation and partially schematic of an auxiliary fuel superheater in operative position on an internal combustion engine, portions thereof broken away and shown in section;

FIG. 2 is a view in exploded perspective of the auxiliary fuel superheater;

FIG. 3 is an enlarged sectional view taken generally along the longitudinal axis thereof;

FIG. 4 is a view similar to FIG. 3 but rotated 90°;

FIG. 5 is a sectional view as seen from the line 5—5 of FIG. 3;

FIG. 6 is a sectional view as seen from the line 6—6 of FIG. 3;

FIG. 7 is a view similar to FIG. 3 showing a modified structure thereof;

FIG. 8 is a sectional view as seen from the line 8—8 of FIG. 7;

FIG. 9 is a sectional view as seen from the line 9—9 of FIG. 7;

FIG. 10 is a view similar to FIGS. 3, 7 showing a still further modified structure thereof;

FIG. 11 is a sectional view as seen from the line 11—11 of FIG. 10 on an enlarged scale;

FIG. 12 is a sectional view as seen from the line 12—12 of FIG. 10, on an enlarged scale; and FIG. 13 is an enlarged sectional view similar to FIGS. 7, 10 showing a further modified structure, portions thereof being broken away.

DESCRIPTION OF THE PREFERRED EMBODIMENT

Referring with greater particularity to the drawings and initially to FIGS. 1–6, there is shown an auxiliary fuel superheater indicated generally by the numeral 15. Fuel superheater 15 is positioned interiorly of the air cleaner *b* adjacent the intake throat *c* of a carburetor *d* which is mounted on the intake manifold *e* of an internal combustion engine A. Inasmuch as the engine A forms no part of the present invention, only that part thereof associated with the fuel superheater 15 is shown. Fuel superheater 15 consists of a generally cylindrical housing 16 which includes a pair of housing portions 17, 18. Adjacent ends of housing portions 17, 18 are telescopically received one within the other, as at 19, to form a chamber 20. Formed at opposite ends to chamber 20, in housing 16, are first and second axial openings 21, 22 respectively. As shown, particularly in FIG. 1, housing 16 is secured to the carburetor by means of a collar 23 so as to position axial opening 22 adjacent throat *c* of carburetor *d*.

A threaded fitting 24 is mounted in first opening 21 in housing 16 by means of a pair of annular electrical insulators 25, 26 and nut 27. An enlarged head of fitting 24 projects slightly into chamber 20 for a reason hereinafter described. Fitting 24 provides means for securing one end of a fuel conduit 28 to housing 16. Fuel conduit 28 extends from fitting 24 through an opening formed in the filter *b* and has its opposite end connected to the conventional fuel line *f* leading to carburetor *d*, as at 29. Fitting 24 further includes an axially extended port 30 in which is mounted an insert having a restricted metering orifice 31 and a ceramic filter 31' for filtering the fuel entering orifice 31. Orifice 31 is of a size to provide the correct supply of fuel to chamber 20 for complete vaporization and superheating.

Mounted in chamber 20, in spaced relation to the side walls of housing 16 is a resistance heating element indicated generally by the numeral 32. Heating element 32 includes first and second connected portions 33, 34 which lie in a pair of planes extending parallel to and on opposite sides of the longitudinal axis of chamber 20. A first end 35 of heating element 32 is connected to that portion of fitting 24 which extends into chamber 20 and a second end 36 of heating element 32 is connected to portion 17 of housing 16. In this manner, heating element 32 is adapted to be connected to a source of electrical potential such as a conventional storage battery 37 normally used to supply electrical energy to internal combustion engine A.

Circuit and switching means (see FIG. 1) for passing electrical energy through resistance heating element 32 includes battery 37, one terminal of which is grounded to the engine A. The other terminal of battery 37 is connected to fitting 24 by means of a conductor 38. Connected in series with conductor 38 is a normally open switch 39d of a relay 39, and a temperature responsive device 40. Temperature responsive device 40 is mounted in close proximity to exhaust manifold g of engine A and acts to open the series circuit in the event exhaust manifold g exceeds a predetermined temperature. Thus, should the engine temperature exceed the predetermined level fuel superheater 15 will not be needed and will be rendered inoperative. It will be noted that the series circuit is completed by connection of heating element 33 to fitting 24 and to housing 16, and housing 16 to carburetor d by collar 23. Relay 39 includes a coil 39e connected in series with a manually operated normally open switch 39f across battery 37. When switch 39f is closed, coil 39e is energized to close switch 39d. Switch 39f would normally be mounted on the automobile dashboard.

Interposed in fuel conduit line 28 is a two position solenoid operated control valve 41 which controls the supply of fuel through conduit 28. A solenoid coil (not shown) but normally contained within the housing of valve 41, has one end connected to conductor 38 between the temperature responsive device 40 and fitting 24. The other end of the solenoid coil of valve 41 is grounded to the engine A to complete the circuit thereto.

Mounted in chamber 20 between the portions 33, 34, and between the portions 33, 34 and the adjacent side walls of housing 16, are a plurality of porous, nonflammable blocks 42, 43, and 44. Blocks 42, 43, and 44 are formed from a material such as asbestos and act to absorb a portion of the fuel entering chamber 20 from port 30 and orifice 31 of fitting 24. Each of the blocks 42, 43, and 44 have flat surfaces 45, 46, 47, and 48 thereon which adjoin portions 33, 34 of heating element 32 to form restricted fuel flow passages 49, 50 along portions 33, 34 of heating element 32. A ceramic disc element 51, having a plurality of restricted openings 52 therein, is positioned adjacent opening 22 of housing 16 to further restrict passage of fuel from chamber 20 before it has been completely superheated by heating element 32. It will be seen that the blocks 42, 43, and 44, forming passages 49, 50, provide means for maintaining the incoming fuel in close proximity to the heating element 32 for a length of time sufficient to permit complete vaporization and superheating of the fuel. The restricted openings 52 of disc 51 serve to further restrict exit of the fuel from the chamber 20 due to expansion of the fuel during the superheating process in order that the superheating of the fuel may be fully completed. Thus, raw fuel from conduit 28 through chamber 20 of fuel superheater 15 is prevented from entering throat c of carburetor d. Instead, superheated fuel introduced into air cleaner b by superheater 15 is instantly mixed with atmospheric air to form a highly combustible mixture before entrance into throat c of carburetor d, intake manifold e, and the combustion chamber (not shown) of the engine A. The superheated fuel is heated to a degree wherein contact thereof with cold metal portions of the engine does not appreciably condense the fuel prior to its entry into the combustion chamber. Thus, a weaker than normal ignition spark, usually caused by cold weather effects on engine parts, is still sufficient to ignite the superheated fuel and start the engine.

OPERATION

With the above-described structure, prior to the time internal combustion engine A is to be started, an operator closes the electrical circuit to fuel superheater 15 by depressing or closing switch 39f for a period of 1 to 3 seconds. Upon closing of switch 39f, an electrical current is supplied through resistance element 32 to ground from battery 37, through switch 39d, conductor 38, and temperature responsive device 40. At the same time, the coil of two position control valve 41 is energized to operate the valve thereof, and permit flow of fuel from fuel lines f through valve 41 and fuel conduit 28 to chamber 20 of superheater 15. As the heating element 32 is brought up to operating temperature, during the above 1 to 3 second period, fuel which has been absorbed by blocks 42, 43, and 44 during previous operation of the engine is vaporized and superheated and expelled into the air filter b. At the termination of the 1 to 3 second pre-heat period, the operator energizes the engine's starting motor to supply raw fuel to superheater 15 through fuel conduit 28 and fuel line f. Fuel received from fuel conduit 28 is, in turn, instantly vaporized and superheated in chamber 20 by the pre-heated heating element 32. The fuel which is superheated during the 1 to 3 second pre-heat period acts as an initial charge of highly combustible vapor entering the combustion chamber of the engine instead of a charge of condensed raw fuel from the carburetor d. In the event initial starting operation fails, continued starting operation of the engine provides a further supply of raw fuel to superheater 15 and, consequently, superheated fuel to throat c of carburetor d. When the engine starts, starting operations thereof are terminated and switch 39d is opened to de-energize the solenoid to close the valve 41 and shut off the supply of fuel to superheater 15. As the engine is shut off, the switch 39f may be momentarily closed to saturate the absorbent blocks 42, 43, and 44 to provide an initial charge of fuel to the superheater 15 for subsequent engine starting operation. It will be noted that at the time of installation of superheater 15, the automatic choke mechanism h is adjusted from the dotted line position of FIG. 1 to the full line position thereof wherein the butterfly valve i is in a slightly opened condition. This allows access of the superheated vapors from fuel superheater 15 into the throat c of carburetor d without obstruction. In addition, if desired, a metal or plastic U-shaped clip j can be attached to butterfly valve i as shown in FIG. 1 to insure that it remains in a slightly opened condition.

DESCRIPTION OF A MODIFIED EMBODIMENT

Referring now to FIGS. 7–9, there is shown a modified structure of superheater 15 indicated generally by the numeral 15a. Parts of superheater 15a, similar to superheater 15, will be indicated by like numerals with the subcharacter a added. It will be seen, by reference to the above-noted figures, that superheater 15a differs from superheater 15 in that the solenoid control valve 41 has been eliminated and a heat sensitive valve, indicated generally by the numeral 53, substituted therefor. Fitting 24 of superheater 15 has been modified to act as a valve housing by counter-boring the port 30a, as at 54, to form a valve seat 55 and providing a pair of secondary fuel ports 56 leading from the counter-bore 54 to the chamber 20a of housing 16a. Received within the counter-bore 54 for movements axially toward engagement with and away from the valve seat 55 of one end 57 thereof, is a needle valve 58. Needle valve 58 controls the flow of fuel through the port 30a, counter-bore 54, and secondary fuel ports 56 into the chamber 20a.

Valve control means 59 for imparting the axial movements to the needle valve 58 includes an L-shaped bracket 60, one leg 61 of which is secured to the valve housing 24a by bolts or the like and the other leg 62 of which extends into the chamber 20a. A bimetal arm 63 has one end thereof connected to the extended end of leg 62 of bracket 59, and the other end thereof operatively connected, as at 64, to the other end of needle valve 58. Thus, it will be seen that when electrical energy is applied to resistance heating element 32a, as above described in the operation of fuel superheater 15, the heat generated thereby acts on bimetal arm 63 to cause it to impart movement to needle valve 58 whereby one end 57 is unseated from valve seat 55. Fuel is then admitted to chamber 20a through orifice 31a, port 30a, counter-bore 54, and ports 56 from fuel conduit 28a. To positively assure seating of valve 58 against valve seat 55, a coiled compression spring 65 is received over a diametrically reduced portion 66 of valve 58. One end of spring 65 is in engagement with a shoulder 67 formed by the reduced portion 66 and the other end thereof is in engagement with leg 61 of bracket 59 to bias valve 58 toward valve seat 55. When heating element 32a is de-energized after the car has started, the cold raw gasoline will quickly cool bimetal 63, allowing spring 65 to force valve 58 against seat 55 to stop the flow of fuel.

DESCRIPTION OF A FURTHER MODIFIED EMBODIMENT

In FIGS. 10–12, a still further modified structure of fuel superheater 15 is shown and is indicated generally by the numeral 15b. Parts of superheater 15b similar to superheaters 15, 15a, will be identified by like numerals with the sub-character b added. Fuel superheater 15b differs from fuel superheater 15, in that a two position control valve 68, mounted directly on the housing 16b, has been substituted for control valve 41. As shown, a valve housing 24b generally similar to that shown in fuel superheater 15a is provided and is modified with respect thereto by forming that portion within the chamber 20b to provide a diametrically reduced portion 70. Mounted on portion 70 is an electrical solenoid coil 71, constructed of a flat strip of electrically conductive material formed into a plurality of insulated convolutions. Coil 71 is connected in series with the electrical circuit to resistance heater 32b by securing the innermost convolution thereof to the portion 70 by spot welding or the like 72, and the outermost convolution thereof to a clamping element 73, also by spot welding or the like 74. Clamping element 73 extends partially around the circumference of coil 71 to hold the convolutions thereof radially in place on portion 70 and is secured to one end 35b of resistance heating element 32b, as at 75. The other end 36b of heating element 32b is connected to housing 16b of fuel superheater 15b in a manner similar to superheaters 15, 15a to complete the series circuit.

Received within the counter-bore 54b of valve housing 24b for movements axially toward and away from a valve seat 55b is a needle valve 58b. One end 57b of needle valve 58b is adapted to engage and seat in the valve seat 55b and the other end thereof is adapted to be partially received in that portion of counter-bore 54b extending through portion 70 of valve housing 24b. A stop bolt 76 is threadedly received in the counter-bore 54b at the free end of portion 70 and serves to axially maintain coil 71 in position on portion 70 and limit axial movement of needle valve 58b away from valve seat 55b. As shown particularly in FIG. 10, needle valve 58b is diametrically reduced to form a shoulder 67b. A coiled compression spring 77 is received over the reduced portion 66b of needle valve 58b and has one end in engagement with shoulder 67b, and the other end in engagement with stop bolt 76. Spring 77 will thus bias needle valve 58b into seating engagement of the end 57b thereof with valve seat 55b to stop the flow of fuel from conduit 28b. In this position, it will be noted that the reduced portion 66b of needle valve 58b terminates in spaced relation to stop bolt 76 to permit axial movement thereof.

During the starting procedure, as described in relation to fuel superheater 15, closing of switch 39f and 39d energizes coil 71, moving needle valve 58b into engagement with stop 76 against the bias of coiled spring 77. This allows fuel to enter chamber 20b from conduit 28b, through orifice 31b, port 30b, counter-bore 54b, and secondary ports 56b. Termination of the starting procedures, by opening switch 39f and 39d, de-energizes coil 71 and permits needle valve 58b to once again engage seat 55b, under the bias of spring 77, to shut off the flow of fuel. It is noted that clamping element 73 is constructed of steel and is adapted to concentrate the lines of force from energized coil 71 within a small area to increase the force applied to valve 58 to overcome the bias of spring 77.

DESCRIPTION OF ANOTHER MODIFIED EMBODIMENT

In FIGURE 13, another modified structure of fuel superheater 15b is shown and is indicated generally by the numeral 15c. Parts of superheater 15c similar to superheater 15b will be identified by like numbers with the sub-character c added. Fuel superheater 15c differs from superheater 15b only in that needle valve 58b and valve housing 24b of superheater 15b have been modified. As shown in FIG. 13, the port 30c has a constant diameter throughout the length of housing 24c. An insert 78 is inserted in port 30c and has an outside diameter sufficient to frictionally hold insert 78 intermediate the opposite ends of valve housing 24c. Insert 78 further is formed to provide a restricted metering orifice 79 adjacent one end and a conical valve seat 80 adjacent the other end thereof. A counter-bore 81 provides communication between valve seat 80 and restricted metering orifice 79 for the passage of fuel through insert 78. A valve element 58c has one end 57c recessed as at 83 for the reception of a resilient plug 84.

Valve element 58c of superheater 15c is positioned within port 30c for axial movement with respect thereto and resilient plug 84 is normally in engagement with valve seat 80 under the bias of spring 77c. Starting operations, such as described in connection with superheated 15b, energize coil 71 moving resilient plug 84 of valve element 58c off valve seat 80 to permit the flow of raw fuel through conduit 24c, metering orifice 79, counter-bore 81, port 30c and secondary fuel ports 56c into chamber 20c. Termination of starting operations, by opening switch 39f, de-energizes coil 71c allowing resilient plug 84 of valve element 58c to engage seat 80 under bias of spring 77c and shut off the flow of raw fuel through port 30c. Further operation of superheater 15c is identical to superheaters 15 and 15b and in the interest of brevity will not be described further.

Although I have described the preferred embodiments of my invention herein, it is evident that many changes can be made without departing from the inventive concept. For example, the particular form of heating element shown and described herein was found to operate most effectively, but other forms of heating element could be utilized in the combination without departing from the invention. Further, a different type of coil could be used to open the needle valve in the embodiment shown in FIG. 10.

It should also be understood that my invention has application in engines other than those employing gasoline as a fuel. For example, diesel engines employing low-grade fuel can be started more easily in cold weather by vaporizing and superheating a portion of that fuel with apparatus according to my invention.

What is claimed is:

1. An auxiliary fuel superheater for internal combustion engines, comprising:
   (a) a housing member having a generally cylindrical chamber therein with first and second openings formed at generally opposite ends thereof;
   (b) a fuel intake conduit connected to said first opening for introducing fuel into said chamber;
   (c) said fuel intake conduit having a restricted orifice formed therein to meter the amount of said fuel being introduced into said chamber;
   (d) a two position control valve connected into said fuel intake conduit to control the flow of fuel therethrough;
   (e) a resistance heating element mounted in said chamber, said element having first and second connected portions thereof lying in a pair of planes parallel to the longitudinal axis of said chamber and on opposite sides thereof;
   (f) means including circuit means and switching means connected to said heating element for passing electric current therethrough;
   (g) a plurality of porous, nonflammable blocks mounted in said chamber between said first and second portions of said heating element and between said heating element and said housing member, said blocks each having a flat surface thereon adjoining said first or second portions of said heating element to form restricted fuel flow passages along said heating element to completely vaporize and superheat said fuel; and
   (h) a disc element mounted in said second opening, having a plurality of small openings formed therethrough to restrict the outward flow of said superheated vapor.

2. An auxiliary fuel superheater for internal combustion engines, comprising:
   (a) a housing member having a chamber therein;
   (b) said housing member having a fuel intake conduit connected thereto for introducing a metered amount of fuel into said chamber;
   (c) a resistance heating element mounted in said chamber;
   (d) circuit means connected to said heating element for passing electric current therethrough;
   (e) porous fuel flow passage forming means mounted in said chamber adjoining and surrounding said heating element to form a restricted fuel flow passage along said heating element to initially completely vaporize said fuel and to force the vaporized fuel to pass along the heating element through said passages to superheat said fuel vapor; and
   (f) said housing member having a restricted outlet opening therein to restrict the outward flow of said superheated vapor from said chamber.

3. An auxiliary fuel superheater for internal combustion engines, comprising:
   (a) a housing member having a chamber therein;
   (b) said housing member having a fuel intake conduit connected thereto for introducing a metered amount of fuel into said chamber;
   (c) a resistance heating element mounted in said chamber;
   (d) circuit means connected to said heating element for passing electric current therethrough;
   (e) a porous material mounted in said chamber adjoining said heating element to form a restricted fuel flow passage along said heating element to completely vaporize and superheat said fuel;
   (f) said housing member having a restricted outlet opening therein to restrict the outward flow of said superheated vapor from said chamber;
   (g) a valve housing mounted within said chamber,
said valve housing having a fuel port extending therethrough between said fuel intake conduit and said chamber, said port being formed to define a valve seat;
   (h) a valve element mounted within said port for movements axially thereof, one end of said valve element being engageable with said valve seat to control said fuel flow; and
   (i) valve control means carried by said valve housing and cooperating with the other end of said valve element to impart axial movements thereto.

4. The apparatus of claim 3 wherein means are provided to electrically insulate said fuel intake conduit and said valve housing from said housing member, wherein a first end of said heating element is connected to said valve housing and a second end thereof is connected to said housing member, and wherein said circuit means are connected to said fuel intake conduit and to said housing member.

5. The apparatus of claim 3 wherein said valve control means includes bracket means connected to said valve housing and extending into said chamber, and means including a bimetal having one end thereof connected to said bracket means and the other end thereof operatively connected to said other end of said valve element to impart said axial movements thereto in response to a temperature change within said chamber.

6. The apparatus of claim 3 wherein said valve control means includes a solenoid coil mounted on said valve housing coaxially with said other end of said valve element, and wherein said circuit means includes means for energizing said coil to impart axial movement to said valve element in a direction away from said valve seat, said valve control means including means for imparting axial movement to said valve element in a direction toward said valve seat upon the de-energization of said coil.

7. The apparatus of claim 6 in which said valve housing is formed to define a diametrically reduced portion extending into said chamber and in which said solenoid coil is mounted on said reduced portion, said coil being constructed of a flat strip of electrically conductive material formed into a plurality of convolutions insulated from one another with the innermost convolution thereof connected to said reduced portion of said valve housing and the outermost convolution thereof connected to said resistance heating element.

8. The apparatus of claim 7 in further combination with a steel clamping element, said clamping element being secured to said outermost convolution and to said resistance heating element and adapted to partially encircle said solenoid coil whereby to exert clamping pressure toward said reduced portion of said valve housing.

9. An auxiliary fuel superheater for internal combustion engines, comprising:
   (a) a housing member having a generally cylindrical chamber therein with first and second openings formed at generally opposite ends thereof;
   (b) a fuel intake conduit connected to said first opening for introducing fuel into said chamber;
   (c) a valve housing mounted within said chamber having a fuel port extending therethrough between said fuel intake conduit and said chamber;
   (d) means including a two position normally closed control valve mounted in said fuel port to control the flow of fuel therethrough;
   (e) a resistance heating element mounted in said chamber;
   (f) a solenoid coil mounted on said valve housing adapted to open said valve when energized;
   (g) means including circuit means and switching means connected in series with said heating element and said coil for passing electric current therethrough;
   (h) means mounted in said chamber to form a restricted fuel flow passage along said heating element to completely vaporize and superheat said fuel; and (i) a disc element mounted in said second opening, having a plurality of small openings formed therethrough to restrict the outward flow of said superheated vapor.

10. In combination with an internal combustion engine having a carburetor mounted thereon with an air intake throat therein and an air filter mounted on said carburetor, a fuel superheater mounted in said air filter directly adjacent said air intake throat, comprising:

(a) a housing having a chamber therein;
(b) a resistance heating element mounted in said chamber, said element having first and second connected, spaced portions;
(c) means for introducing a metered amount of fuel into said chamber;
(d) means including porous block means mounted in said chamber between said first and second portions and between said heating element and said housing to form restricted fuel flow passages along said element to completely vaporize and superheat said fuel upon energization of said heating element; and
(e) means for restricting the outward flow of said superheated vapor from said chamber.

11. A fuel vaporizer and superheater, comprising:

(a) a housing having a chamber therein and having inlet means for introducing liquid fuel into said chamber and outlet means for discharging superheated fuel vapor therefrom;
(b) a heating element mounted in said chamber, extending generally between said inlet means and outlet means; and
(c) means mounted in said chamber between said heating element and said housing to restrict the fuel flow to narrow passages along said element during travel of said fuel from said inlet means to said outlet means to completely vaporize and superheat said fuel passing therethrough upon the energization of said heating element.

References Cited

UNITED STATES PATENTS

| | | | |
|---|---|---|---|
| 1,225,381 | 5/1917 | Wedge | 431—208 |
| 1,446,087 | 2/1923 | Griffin | 123—180 |
| 1,459,667 | 6/1923 | Anderson | 123—180 |
| 1,503,905 | 8/1924 | Mackie | 123—180 |
| 1,578,693 | 3/1926 | Vernet | 123—180 |
| 1,640,902 | 8/1927 | Litle | 123—180 X |
| 1,872,268 | 8/1932 | Frank et al. | 123—180 |
| 2,851,027 | 9/1958 | Kivela | 123—187.5 |
| 3,055,750 | 9/1962 | Carolis | 431—208 X |
| 3,259,119 | 7/1966 | Kivela | 123—187.5 |

WILLIAM L. FREEH, *Primary Examiner.*

U.S. Cl. X.R.

123—187.5; 431—26